United States Patent
Schreurs et al.

(10) Patent No.: US 7,038,982 B2
(45) Date of Patent: May 2, 2006

(54) METHOD AND RECORDING DEVICE FOR SELECTING AN OPTIMIZED WRITE STRATEGY AND RECORDING MEDIUM FOR USE BY THE METHOD

(75) Inventors: Gerard Elise Noel Schreurs, Hasselt (BE); Geert Luyten, Hasselt (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 625 days.

(21) Appl. No.: 10/207,534

(22) Filed: Jul. 29, 2002

(65) Prior Publication Data

US 2003/0058765 A1    Mar. 27, 2003

(30) Foreign Application Priority Data

Sep. 27, 2001 (EP) .................... 01203655

(51) Int. Cl.
*G11B 5/09* (2006.01)

(52) U.S. Cl. ................. 369/47.53; 369/47.5; 369/53.1; 369/59.1

(58) Field of Classification Search ............... 369/47.1, 369/47.5, 47.51, 47.52, 47.53, 47.54, 47.55, 369/53.1, 53.11, 59.1, 59.11, 116
See application file for complete search history.

(56) References Cited

U.S. PATENT DOCUMENTS

| 5,226,027 | A | * | 7/1993 | Bakx | 369/47.55 |
| 5,502,702 | A | | 3/1996 | Nakajo | 369/58 |
| 5,872,763 | A | | 2/1999 | Osakabe | 369/116 |
| 6,134,209 | A | | 10/2000 | Den Boef | 369/116 |

FOREIGN PATENT DOCUMENTS

EP    0621589 A1    10/1994

* cited by examiner

*Primary Examiner*—Muhammad Edun
(74) *Attorney, Agent, or Firm*—Michael E. Belk

(57) ABSTRACT

The invention relates to a method and recording device for selecting an optimal write strategy for a specific type of optical recording disk. Such an optimal write strategy is selected even when the optical recording disk is of a type that has not been previously encountered or when the optical recording disk is otherwise unrecognized by an optical disk drive. The optimal write strategy and associated settings are selected from a set of write strategies stored in a disk drive. The disk drive bases its selection of the write strategy on the performance results of test writings conducted on the optical disk. The method entails testing the write strategies first at the maximum possible write speed and if necessary, at successively lower speeds until a write strategy that achieves a minimum acceptable write quality is identified or until the minimum write speed is reached. The selected optimal write strategy may be stored in the recording device or, alternatively, on the optical recording disk itself.

20 Claims, 3 Drawing Sheets

METHOD AND RECORDING DEVICE FOR SELECTING AN OPTIMIZED WRITE STRATEGY AND RECORDING MEDIUM FOR USE BY THE METHOD

The present invention relates to writing information to an optical recording medium, such as an optical disk, and more specifically to a method and a recording device for selecting and learning an optimal write strategy for a specific optical disk. The invention also relates to a recording medium for use by the method according to the invention.

Optical media store data in digital form and include all the various CD and DVD optical disk technologies. The data stored on this media can consist of video, text, audio, computer data, or any other form of digital information. This data is written to and read from an optical disk using a laser.

There are various manufacturers of optical disks. Therefore many different formats and disk types are commercially available. Even within a standardized disc format, such as for example CD-R, CD-R/W, DVD-R, DVD-R/W, each type of optical disk may possess different material parameters. Because of this, each type may behave differently when exposed to a write pulse from a laser. If uncompensated, such differences in behavior result in variations in write performance such as, for example, in jitter and asymmetry of the written marks. Therefore, for an optimum write performance each type of optical disk may require a different write strategy to compensate for its material parameters and other characteristics.

In this application a mark is understood to be any type of optically detectable area on an optical disk. It includes a pit formed by locally heating the area on the optical disk and amorphous areas in a crystalline layer in the optical disk. A write strategy is understood to be any sequence of laser pulses, generated by the laser, causing a mark to be formed on the optical disk when irradiated by the laser pulses.

In one approach an optimal writing strategy is developed for each optical disk by conducting a test writing before attempting to write user information to the disk. The test writing is, in general, made on an inner portion of a lead-in area of the optical disk while incrementally adjusting the write power. Next, the recorded information is read from the test area. The write power at which the desired quality (for example a lowest error rate, an optimum modulation factor, or a lowest jitter factor) and asymmetry of the test writing is obtained is selected as the optimum write power, which is subsequently used for the actual recording of user information. However, this approach is disadvantageous in that the results of the test writing are not retained by the disk drive. Therefore, the test writing must be repeated, even on optical disks of the same type, which can be burdensome. Furthermore, each parameter of the write strategy must be developed for each disk, thereby requiring a significant analysis of the characteristics of the test writing.

Another approach requires each optical disk type to be "registered" by an optical disk drive when that drive is manufactured. During the development of an optical disk drive, its manufacturer investigates and develops an optimal write strategy for each type of optical disk of which the drive manufacturer is aware. The manufacturer then compiles data representing a list of compatible optical disk types along with the corresponding optimal write strategy for each optical disk type. This data is often stored in the optical disk drive in a control information memory such as for example an EEPROM, and may contain such recording parameters as the optimum write power, the time modulation, the linear velocity, and the recording speed. A drive then can recognize a particular optical disk type by scanning the lead-in portion of the disk. The characteristics of the lead-in portion of each optical disk type vary by disk manufacturer, thus identifying the manufacturer of the disk.

A significant drawback of this "registration" methodology is that an optical disk drive cannot write to an unregistered optical disk type using a write strategy that has been optimized for that particular optical disk type. In other words, an optical disk drive that encounters an unregistered optical disk type does not recognize that disk and therefore cannot access a stored optimal write strategy. When such an unregistered disk is encountered, either the drive is incompatible with the new optical disk type or a generic, and hence non-optimal, write strategy stored in the optical disk drive is applied. Typically, even if the optical disk drive is able to write to the unregistered disk, it writes at a lower speed (for example, it may write at 4× or even 2×) rather than at the highest possible recording speed (for example, 24×).

There is a need in the art for a simplified method for a disk drive to determine and learn the optimum write strategy for writing to an optical disk of a previously unregistered type. The optimum write strategy should ensure a quality transfer of information to the optical disk at the maximum possible speed. It is therefore an object of the present invention to provide such a method and a recording device using such method.

The method and recording device according to the present invention address the problems in the art by selecting and learning an optimal write strategy by testing the performance of different known write strategies, selecting the best write strategy for the particular optical disk type, and storing that information for use when the same optical disk type is subsequently encountered.

In general, information about the best write strategy will be stored in the recording device for use when the same optical disk type is subsequently encountered. However, according to an embodiment of the invention, the information about the best write strategy for use with a specific disk is written to the disk itself. When the disk is subsequently encountered, this information is read from the disk and used by the recording device for selecting the best write strategy.

First, at least two, but alternatively up to as many as all, of the write strategies are selected from a list of write strategies stored in an optical disk drive. Next, for each selected write strategy a sequence of marks representing a test pattern is recorded in a test area, such as the Optimal Power Calibration (OPC) area, of an optical disk or similar recording medium. In another embodiment of the present invention, by varying its settings more than one test pattern is recorded for each selected write strategy.

Next, the test patterns are read back from the optical disk by the optical disk drive. Finally, a write strategy and its corresponding settings is selected based upon parameters derived from reading the test patterns. The selected write strategy is learned by the disk drive so that it is subsequently used to write information to the particular optical disk type.

According to an embodiment of the present invention, a first set of test patterns is written at the maximum possible recording speed (for example 24×). If none of the test patterns written at this speed achieves the minimum desired write quality, the speed is lowered and new test patterns are written and analyzed. This procedure is repeated until the disk is written at the highest speed at which the minimum write quality is attained or at the lowest possible write speed.

A further embodiment of the present invention will first perform an optical disk type identification step to determine whether the optical disk is of a registered type. When the disk type is not registered with the optical disk drive, a write strategy selection method of an aforementioned embodiment of this invention is performed.

The present invention will be described in greater detail hereinafter an the basis of on preferred embodiments with reference to the accompanying figures, in which FIG. 1 shows a functional block diagram of a CD-RW recording device according to an exemplary embodiment of the invention;

According to embodiments of the method and the recording device of the present invention, an optical disk drive utilizes the Optimal Power Calibration (OPC) area of a disk of a previously unregistered disk type to test various write strategies and settings and, dependent on the results of the test selects the most optimal write strategy of those tested.

An exemplary embodiment of the present invention is implemented in a CD-R/W drive. However, it is to be noted that the invention is also applicable in drives for other writable and rewritable CD, DVD, and other optical disk formats such as, for example, DVD-R/W and CD-R. Those skilled in the art will appreciate that the method of the invention can also be implemented for recording media other than disks.

Figure 1:
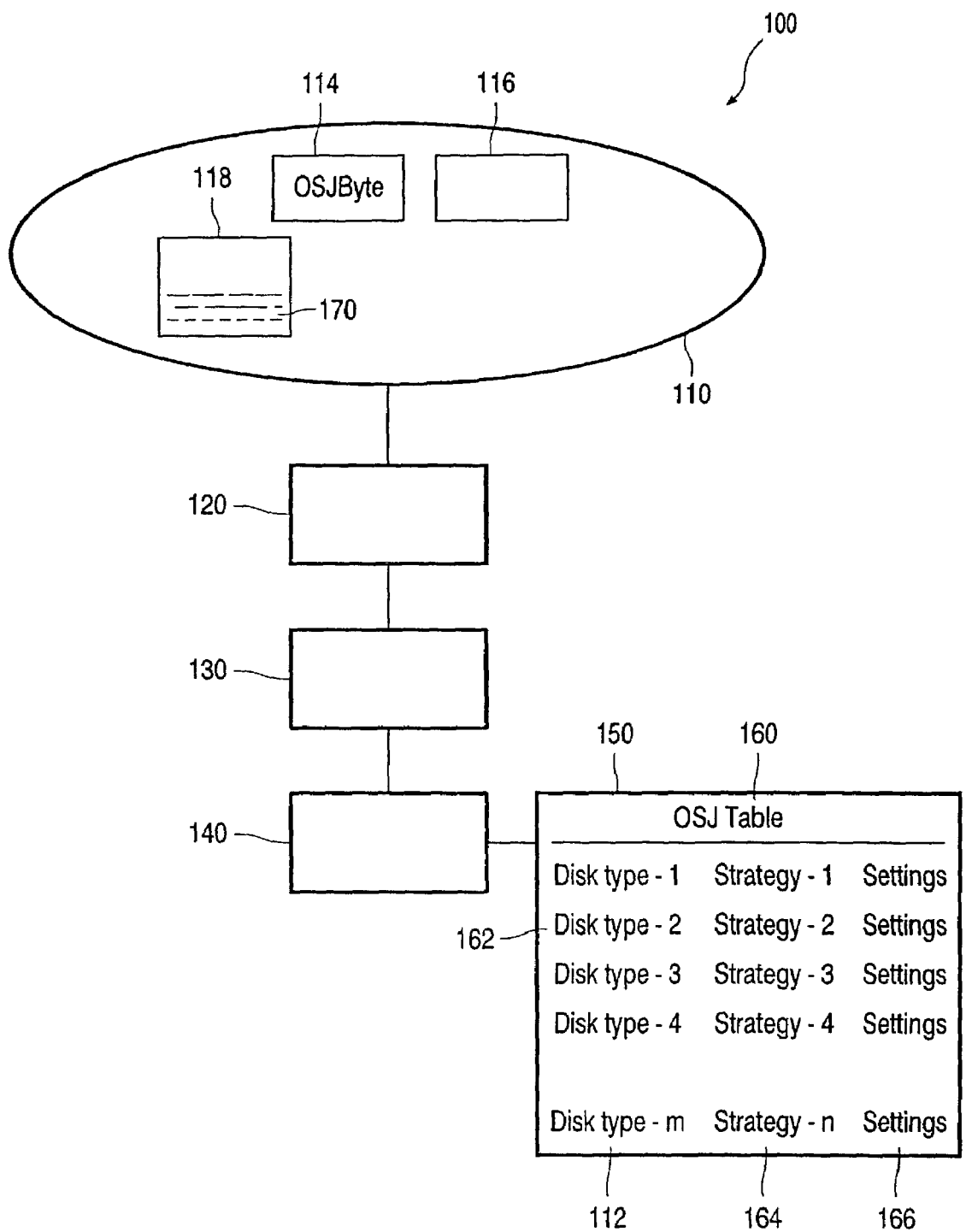

FIG. 1 schematically shows an exemplary environment, that is, an optical disk drive 100. This optical disk drive 100 contains a read/write laser 120, a controller 130, a processor 140, and a memory 150. An optical disk 110 of a disk type 112 may be present in the optical disk drive 100. The optical disk 110 may contain any or all of an OSJByte 114, a lead-in portion 116, and an OPC area 118. The memory 150 contains an OSJ table 160, being a compilation of data records 162. Each data record 162 comprises at least one write strategy 164, associated settings 166, and any disk type(s) 112 related to the write strategy 164. The data records 162 in the OSJ table 160 may also comprise references to standard write strategies 164 and/or standard settings specified in the Orange book ("Compact disc Rewritable, CD-RW System Description"). Orange Book standards may alternatively be stored elsewhere in the memory 150.

Figure 2:
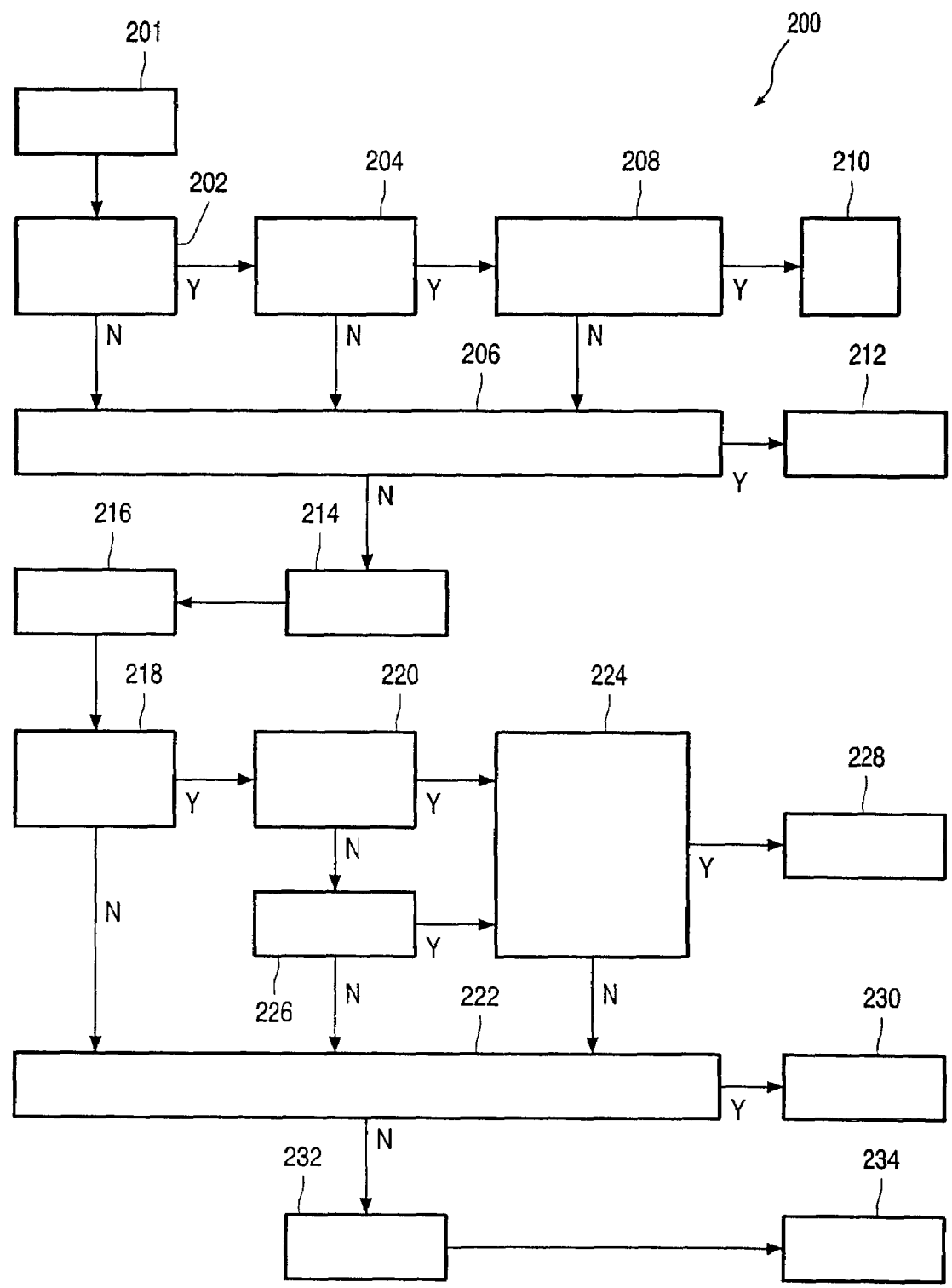
FIG. 2 shows a flow chart of the general operation of an exemplary embodiment of the present invention.

FIG. 2 shows the flow chart of an exemplary method 200 for selecting a write strategy 164 for a disk 110 that has been introduced into the disk drive 100. First, in block 201 the write speed of the optical disk drive 100 is set to the maximum possible speed (for example 24×). Next, in block 202 the disk 110 is checked at this maximum possible speed for any identifying information, such identifying information being contained in an OSJByte 114. When no OSJByte 114 is detected, the method proceeds to block 206. When an OSJByte 114 is detected, the OSJ table 160 is queried to determine whether the characteristics of the lead-in path 116 of the disk 110 are stored in the OSJ table 160. If the lead-in path 116 is identified, the method proceeds to block 204 where the OSJ table is queried to determine whether a write strategy 164 has been defined for the disk 110. If a write strategy 164 has been defined, the method writes, in block 208, a test pattern 170 to the OPC area 170 of the disk 110 according to a methodology which is described in more detail below (with reference to FIG. 4). The test pattern 170 is then read back and the performance of the write strategy 164 is evaluated. If the performance exceeds preset performance criteria, for example BLER<50 and jitter<25 ns, the method proceeds to block 210 where user information is written to the disk 110 at the maximum possible speed using the defined write strategy 164. However, if in block 204 it is determined that no write strategy 164 has been defined, or when in block 208 it is determined that the defined write strategy 164 fails to meet the preset performance criteria, the method proceeds to block 206.

Block 206 initiates the self-learning method of the exemplary embodiment of the present invention which is described in more detail below (with reference to FIG. 3). The self-learning method entails at least one test pattern 170 being written to the disk 110 using at least one set of settings 166 of at least one write strategy 164 from the OSJ table 160. It is to be noted that in this exemplary embodiment test writing occurs in an area between the fine and the rough areas of the OPC area 118 of the disk 110. The test pattern 170 is read and evaluated to determine whether a particular write strategy 164 from the OSJ table 160 yields a result that exceeds the preset performance criteria. If there is such a write strategy 164, it is selected. In block 212, user information is then written to the disk 110 at the maximum possible speed and using the selected write strategy 164, and the OSJ table 160 is updated to include a data record 162 that defines the selected write strategy 164 as optimal for that disk type 112.

If no write strategy 164 yields an acceptable result (that is, does not fulfill the performance criteria), the method proceeds to block 214 where the OSJ table 160 is updated to include a data record 162 with a setting 166 that indicates that the disk 110 is of a disk type 112 that cannot be written at the maximum possible speed. The recording speed is then set to a lower speed (for example 8×) in block 216. In block 218, the disk 110 is again checked for an OSJByte 114. If no OSJByte 114 is detected, the method proceeds to block 222. If an OSJByte 114 is detected, the OSJ table 160 is queried to determine whether the characteristics of the lead-in path 116 of the disk 110 are stored in the OSJ table 160. If the lead-in path 116 is identified, the method proceeds to block 220 where the OSJ table is queried to determine whether a write strategy 164 has been defined for the disk 110. When in block 220 it is determined that no write strategy 164 has been defined, the method proceeds to block 226 where Orange Book standards ("Compact disc ReWritable, CD-RW System Description") are queried to determine whether a standard write strategy 164 has been designated as optimal for the particular disk type 112. When a write strategy 164 has been defined or designated by the Orange Book standard, the method writes, in block 224, another test pattern 170 to the OPC area 180 of the disk 110, but this time at the lower recording speed. The test pattern 170 is then read back and the performance of the write strategy 164 is evaluated. If the performance exceeds preset performance criteria, the method proceeds to block 228 where information is written to the disk 110 at the lower recording speed using the defined write strategy 164. However, when in block 224 it is determined that the defined write strategy 164 fails to meet the preset performance criteria, or if no write strategy is defined or designated in blocks 220 and 226, the method proceeds to block 222.

Block 222 repeats the self-learning method of block 206, but at the lower speed. Again, at least one test pattern 170 is written to the disk 110 using at least one set of settings 166 of at least one write strategy 164 from the OSJ table 160. The test pattern 170 is read back and evaluated to determine whether a particular write strategy 164 from the OSJ table 160 yields a result that exceeds the preset performance criteria. If there is such a write strategy 164, it is selected and the method proceeds to block 230. In block 230, information is written to the disk 110 at the lower recording speed using the selected write strategy 164, and the OSJ table 160 is updated to include a data record 162 that defines the selected write strategy 164 as optimal for that disk type 112.

If no write strategy 164 yields an acceptable result, the method proceeds to block 232 where the OSJ table 160 is updated to include a data record 162 with a setting 166 that indicates that the disk 110 is of a disk type 112 that cannot be written at the lower recording speed. The speed is then set at the lowest recording speed (for example 2×) and, in block 234, user information is written to the disk 110 at this lowest recording speed.

According to an alternative embodiment of the invention, besides updating the OSJ table 160 to include a data record 162 that defines the selected write strategy 164 as optimal for that disk type 112, information identifying the selected write strategy is written to an area on the disk itself comprising information regarding disk parameters such as, for example, the lead-in area 116. When the disk is subsequently encountered, this information is read from the disk and used by the recording device for selecting the optimal write strategy.

The self-learning method evaluates the writing performance of several write strategies 164 by writing test patterns 170 in the OPC area 118 of a disk 110. The general algorithm, used in this self-learning method, for testing N write strategies 164 with M sets of settings 166 per write strategy 164 and by writing test patterns 170 for a duration T is as specified by the following pseudo-code:

```
For k: = 1 to N,
        Select write_strategy(k)
        For l: = 1 to M,
                Select set_of_settings(1)
                Write to disk for a period Δt = T
        End,
End;
Read the test patterns;
For each write_strategy(k),
        evaluate performance, including jitter as a function of
        asymmetry;
Select a write_strategy(k) and the corresponding set_of_settings that
optimize performance.
```

Figure 3:
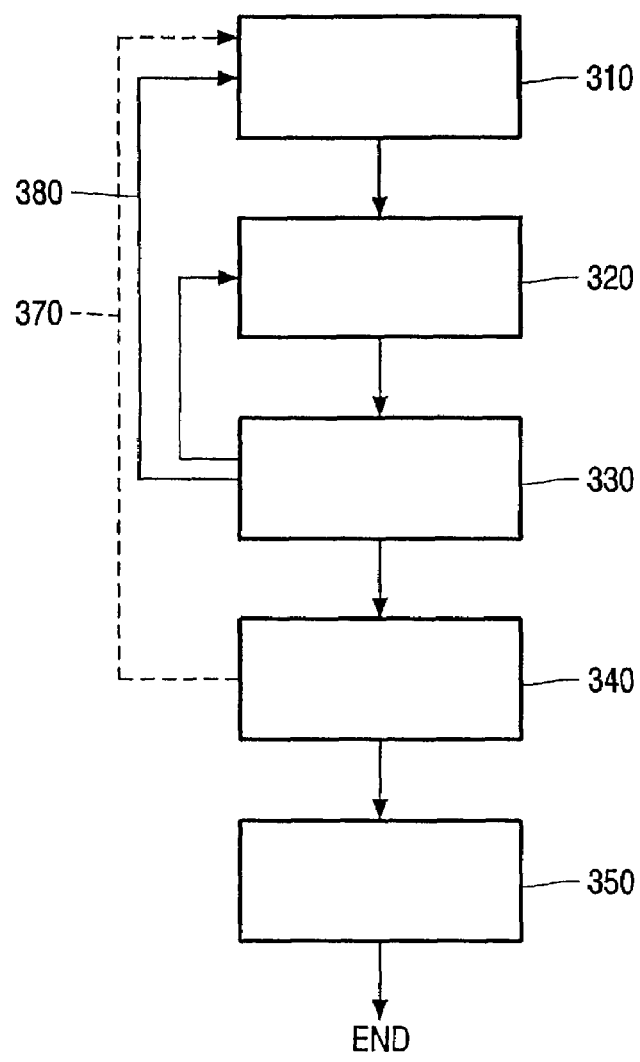
FIG. 3 shows a flow chart of the self-learning method according to an exemplary embodiment of the present invention.

Referring now to the flow chart shown in FIG. 3, the self-learning method begins in block 310 where a write strategy 164 is selected. Next, the method proceeds to block 320 where a set of settings 166 corresponding to the selected write strategy 164 is selected. Then, in block 330, a test pattern 170 is written according to the selected write strategy 164 and the corresponding set of settings 166. Until all intended sets of settings 166 have been selected, the method loops back to block 320. When all intended sets of settings 166 have been selected and used to generate test patterns 170, the method loops back to block 310 where the next write strategy 164 to be tested is selected. When test patterns 170 have been written using all intended write strategies 164 along with associated intended sets of settings 166, the algorithm proceeds to block 340 where the test patterns 170 are read back, evaluated and the result of the evaluation compared with performance criteria. In block 350 the write strategy 164 and associated set of settings 166 that yield the desired performance is selected as the optimal write strategy 164.

Alternatively, with the iteration 370 replacing the iteration 380, the self-learning algorithm can be performed one write strategy 164 at a time. Now, the step 340 of reading the test patterns 170 and evaluating the performance is moved inside the logical loop created by steps 310, 320, and 330, thereby comparing performance of each write strategy 164 with preset performance criteria before returning to block 310 to select another write strategy 164 for testing. With this alternative, a new write strategy 164 is selected or generated until the performance criteria are exceeded, at which point the loop terminates.

In the exemplary embodiments of the invention described above, the self-learning algorithm is performed in the event that an unregistered disk is encountered, that is, when no write strategy 164 has been defined or designated for a particular disk. In an alternative embodiment, the algorithm is performed every time a disk drive 100 encounters any disk. This embodiment does not require storage of an OSJ table 160 or of Orange Book standards. Rather, the algorithm generates each write strategy 164 to be tested on the disk 110.

Write strategies 164 may be generated or selected for testing in a predetermined sequence. Alternatively, the sequence of testing of the write strategies 164 stored in the OSJ table 160 may be determined according to frequency of use, characteristics of the disk 110, type of disk drive 100, or according to any other parameter.

According to an embodiment of the invention, the first 61 data records 162 in the OSJ table 160 are reserved for the disk types 112 that have write strategies 164 pre-defined during development of the drive 100. The remaining data records 162 are reserved for self-learned entries. If the drive 100 exhausts all available entries, then entry 62 is overwritten for the next new entry. This procedure ensures that written disks are readable in the drive itself and in most ROM players.

Figure 4:
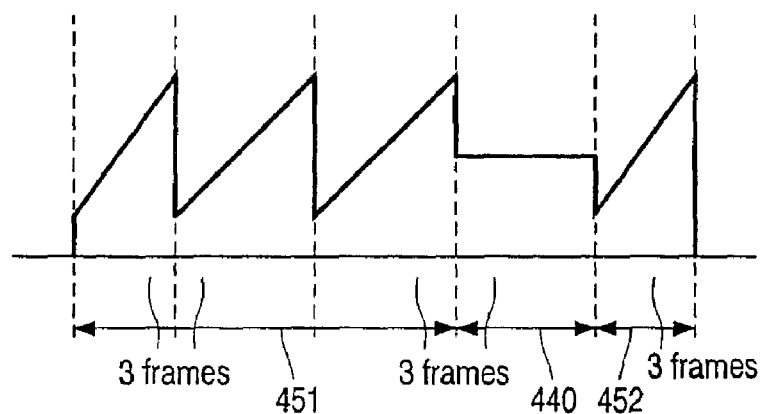
FIG. 4 shows a graph indicating an OPC area in which test patterns are written according to an exemplary embodiment of the present invention.

Referring now to FIG. 4, the self-learning method writes test patterns 170 in a test area 440 between the fine portions 451 and the rough portions 452 of the OPC area 118 on the disk 110 in order to achieve stable (EFM) modulation. This test area consists of three frames. The performance of the test writing is evaluated according to a logical subroutine of the self-learning method. The following pseudo-code is an example of how to measure jitter from the first of the three written frames:

```
If jitter_frame_1 < 15 ns
    OR
jitter_frame_1 < jitter_limit^E and BLER > 50
    OR
jitter_frame_1 > jitter_limit^E and BLER < 50
    then
Retry measurement
    ELSE
If jitter_frame_1 < jitter_limit^E and BLER < 50
    Then use the current set_of_settings
    ELSE
GOTO the next write_strategy in the OSJ table.
```

In the following paragraph a functional example of an embodiment according to the invention is described with reference to FIG. 1. A disk 110 is inserted into a disk drive 100 so that information can be written by the drive 100 to the disk 110. The disk type 112 is unknown to the drive 100. First, the write speed of the optical disk drive 100 is set to the maximum possible speed (for example, 24×.). Next, the processor 140 instructs the controller 120 to initiate a read session during which the optical disk drive 100 checks the disk 110 for any identifying information that can be used to locate the lead-in 116 (data path) and the write strategy 164 of the disk 110. If identifying information is found, the processor 140 accesses the OSJ table 160 in the memory 150, retrieves the write strategy 164 and the set of settings 166 associated with the identifying information, and uses the retrieved write strategy 164 to write information to the optical disk 110. If identifying information is not found, the processor 140 instructs the controller 130 to initiate a test writing session. The processor 140 retrieves a write strategy 164 to be tested. The write strategy 164 is communicated to the controller 130 which directs the laser 120 to write a test pattern 170 into the OPC area 118 of the disk 110. The processor 140 can continue to retrieve and relay write strategies 164 to the controller 130 until a predetermined set of write strategies 164 has been used to write test patterns 170 or, alternatively, a performance evaluation may be conducted on each test pattern 170 immediately after the test pattern 170 is written. The processor 140 determines which write strategy 164 is selected to write information to the disk 110 according to the performance achieved by the write strategies 164. The selected write strategy 164 is then used to write information to the optical disk 110. The processor creates a data record 162 in the OSJ table 160 and populates the data record 162 with the disk type 112, the selected write strategy 164, and the selected set of settings 166.

In view of the foregoing, it will be appreciated that the present invention provides a method and device for establishing and learning an optimum write strategy for writing information to a writable or rewritable medium. Still, it should be understood that the foregoing relates only to the exemplary embodiments of the present invention and that numerous changes may be made thereto without departing from the spirit and scope of the invention as defined by the following claims.

The invention claimed is:

1. A method for selecting a write strategy from a set of write strategies, comprising the steps of writing at least one test pattern to the information carrier while applying at least one write strategy front the set of write strategies, reading the written test pattern(s) from the information carrier, and determining which write strategy of the set of write strategies is optimal for writing information to the information carrier based on at least one parameter derived from reading the test pattern(s).

2. A method as claimed in claim 1, wherein said writing of the test pattern(s) is accomplished by applying all of the write strategies from the set of write strategies.

3. A method as claimed in claim 1, wherein said writing of the test pattern(s) is accomplished by applying at least two distinguishable sets of settings for each write strategy, which method also comprises the step of selecting an optimal set of settings related to the selected optimal write strategy based on at least one parameter derived from reading the test pattern(s).

4. A method as claimed in claim 3, wherein said optimal write strategy and said optimial set of settings related to said optimal write strategy are stored in the set of write strategies.

5. A method as claimed in claim 4, wherein each write sintegy and at least one set of settings related to that write strategy in the set of write strategies relates to at least one type of information carrier for which the write strategy and the set of settings related to that write strategy have been determined as optimal.

6. A method as claimed in claim 1, wherein said optimal write strategy is stored in the set of write strategies.

7. A method as claimed in claim 6, wherein each write strategy in the set of write strategies relates to at least one type of information carrier fir which the write strategy has been determined as optimal.

8. A method as claimed in claim 1, also comprising the step of selecting said determined optimal write strategy for subsequently writing information to the information carrier.

9. A method as claimed in claim 8, also comprising the step of writing information identifying the selected optimal write strategy on the information carrier.

10. An information carrier comprising an area in which parameters related to the information carrier are stored, which parameters are used for setting recording means in a recording device far recording information on the information carrier, characterized in that the area comprises at least one parameter identifying a selected optimal write strategy for the information carrier, the selected optimal write strategy being selected by means of a method as claimed in claim 9.

11. A recording device for writing information to an information carrier, comprising a radiation source for generating a sequence of radiation pulses according to a preselected write strategy, control means for controlling the recording device, and read means for reading at least one parameter identifying a selected optimal write strategy for the information carrier, the selected optimal write strategy being selected by means of a method as claimed in claim 9, the control means being arranged to set the per-selected write strategy from the at least one parameter identifying the selected optimal write strategy.

12. A recording device for writing information to an information carrier, comprising a radiation source for generating a sequence of radiation pulses according to a write strategy, control means for controlling the recording device, and storage means for storing a set of write strategies, the control means being arranged to execute a method as claimed in claim 8 for selecting an optimal write strategy from the set of write strategies.

13. A method for selecting a write strategy from a set of write strategies, where said selected write strategy will be used to write information to a target information carrier, which method comprises the steps of identifying the type that corresponds to the target information carrier, if the target information carrier type is related to a write strategy in the set of write strategies, selecting the related write strategy for writing information to the target information carrier, and if said target information carrier is not related to a write strategy in the set of write strategies, selecting an optimal writes strategy for writing information to the information carrier using the method as claimed in claim 1.

14. A method for selecting a write strategy from a set of write strategies as defined by claim 1, wherein applying the at least one write strategy from the set of write strategies comprises initializing parameters that establish a minimum acceptable write quality, reading the written test pattern(s) from the information carrier and determining whether at least one write strategy of the set of write strategies for writing to the information carrier achieves the minimum acceptable write quality.

15. A method for selecting a write strategy from a set of write strategies as defined by claim 1, wherein applying the at least one write strategy from the set of write strategies comprises setting a write speed to a first write speed, writing at least one test pattern to an information carrier while applying at least one write strategy from the set of write strategies and determining if there is another write speed lower than the first write speed that achieves the minimum acceptable write quality.

16. A method for selecting a write strategy from a set of write strategies as defined by claim 15, wherein setting the write speed further comprises if the second lower write speed does not exist, selecting the write strategy for writing to the information carrier that achieves the best write quality.

17. A method for selecting a write strategy from a set of write strategies as defined by claim 15, wherein, setting the write speed to the second lower write speed further comprises repeating;
- writing at least one lest pattern to an information carrier while applying at least one write strategy from the set of write strategies,
- reading the written test pattern(s) from the information carrier, and
- determining whether at least one write strategy of the set of write strategies for writing to the information carrier achieves the minimum acceptable write quality.

18. A method for selecting a write strategy from a set of write strategies, where the selected write strategy will be used to write information to an information carrier, which method comprises the steps of a) initializing parameters that establish a minimum acceptable write quality, b) setting a write speed to a first write speed, c) writing at least one test pattern to an information carrier while applying at least one write strategy from the set of write strategies, d) reading the written test pattern(s) from the information carrier, e) determining whether at least one write strategy of the set of write strategies for writing to the information carrier achieves the minimum acceptable write quality, f) selecting one of the set of write strategies that achieve the minimum acceptable write quality, g) if none of the write strategies achieves the minimum acceptable write quality, determining whether there is a second write speed lower than the first write speed; h) if there is a second lower write speed, setting the write speed to the second lower write speed and repeating the method as from step c), and i) if there is no second lower write speed, selecting the write strategy for writing to the information carrier that achieves the best write quality.

19. A method as claimed in claim 18, wherein the first write speed is a maximum possible write speed.

20. A method as claimed in claim 18, where the selected one of the set of write strategies that achieves the minimum acceptable write quality is the write strategy that offers the best write quality.

* * * * *